US009396877B2

(12) United States Patent
Miura et al.

(10) Patent No.: US 9,396,877 B2
(45) Date of Patent: Jul. 19, 2016

(54) HIGH VOLTAGE CAPACITOR
(71) Applicant: TDK CORPORATION, Tokyo (JP)
(72) Inventors: Iwao Miura, Tokyo (JP); Hitoshi Kudo, Tokyo (JP); Masato Sakakibara, Tokyo (JP)
(73) Assignee: TDK CORPORATION, Tokyo (JP)
( * ) Notice: Subject to any disclaimer, the term of this patent is extended or adjusted under 35 U.S.C. 154(b) by 248 days.
(21) Appl. No.: 14/106,042
(22) Filed: Dec. 13, 2013
(65) Prior Publication Data
US 2014/0177131 A1 Jun. 26, 2014
(30) Foreign Application Priority Data Dec. 21, 2012 (JP) ................. 2012-279633

(51) Int. Cl.
*H01G 4/224* (2006.01)
*H01G 2/10* (2006.01)
*H01G 4/228* (2006.01)
(52) U.S. Cl.
CPC ............... *H01G 4/224* (2013.01); *H01G 2/103* (2013.01); *H01G 2/106* (2013.01); *H01G 4/228* (2013.01)
(58) Field of Classification Search
CPC ....... H01G 4/224; H01G 4/228; H01G 2/106; H01G 2/103
See application file for complete search history.

(56) References Cited

U.S. PATENT DOCUMENTS

| | | | | |
|---|---|---|---|---|
| 3,946,290 A * | 3/1976 | Yoshioka | ............... | H01G 4/228 361/306.1 |
| 4,882,115 A * | 11/1989 | Schmickl | ............... | H01G 9/008 29/25.03 |
| 5,587,869 A | 12/1996 | Azumi et al. | | |
| 5,978,203 A * | 11/1999 | Kiyomura | ................ | H01G 9/12 361/301.3 |
| 6,181,543 B1 * | 1/2001 | Kobayashi | ............... | H01G 2/12 361/301.3 |
| 6,344,962 B2 * | 2/2002 | Asada | ........................... | 361/302 |
| 6,885,538 B1 * | 4/2005 | Ishii | ......................... | H01G 2/06 361/301.3 |
| 2001/0036053 A1 | 11/2001 | Asada et al. | | |
| 2006/0104006 A1 * | 5/2006 | Saito | ......................... | H01G 2/04 361/301.3 |
| 2009/0273916 A1 * | 11/2009 | Hironaka | ................. | B60K 6/28 361/830 |

FOREIGN PATENT DOCUMENTS

| | | |
|---|---|---|
| CN | 1231931 A | 10/1999 |
| CN | 101385102 A | 3/2009 |
| CN | 201315248 Y | 9/2009 |

(Continued)

OTHER PUBLICATIONS

May 10, 2016 Notice of Reasons for Rejection issued in Japanese Application No. P2012-279633.

*Primary Examiner* — David M Sinclair
(74) *Attorney, Agent, or Firm* — Oliff PLC (57) ABSTRACT A high voltage capacitor comprises a columnar capacitor element body, made of a dielectric material, having a pair of principal surfaces opposing each other; a pair of electrodes arranged on the respective principal surfaces; a pair of terminal metal fittings connected to the respective electrodes; a case; and a resin part. The case contains a resin material and has a bottom part formed with an opening for exposing the terminal metal fitting and a trunk part extending from an edge of the bottom part in a direction intersecting the bottom part. The bottom part and trunk part define a space for containing the capacitor element body. The resin part is made of an insulating material and arranged within the case so as to seal the capacitor element body within the case. The case has a degree of hardness lower than that of the resin part.

16 Claims, 6 Drawing Sheets

(56) References Cited

FOREIGN PATENT DOCUMENTS

| | | |
|---|---|---|
| JP | S62-192624 U | 12/1987 |
| JP | A-8-130158 | 5/1996 |
| JP | 2003309038 A * | 10/2003 |
| JP | 2010-080639 A | 4/2010 |

* cited by examiner

HIGH VOLTAGE CAPACITOR

BACKGROUND OF THE INVENTION

1. Field of the Invention

The present invention relates to a high voltage capacitor.

2. Related Background Art

Conventionally known as a high voltage capacitor used in an atmosphere containing a halogen gas is one covering the outer periphery of a capacitor body with a resin part made of an epoxy resin or the like and containing the capacitor body and resin part in a case made of a material, such as alumina, for example, which is resistant to halogen gases and UV rays (see, for example, Japanese Patent Application Laid-Open No. H08-130158).

SUMMARY OF THE INVENTION

The resin part may change its form because of the following reasons. For example, a resin may shrink when being cured for forming the resin part. The resin part may expand or shrink when its environment of use changes. When the resin part changes its form, a stress may occur in the interface between the resin part and the case containing the resin part and regions near the interface. In the high voltage capacitor described in Japanese Patent Application Laid-Open No. H08-130158, the case is made of a material having a relatively high degree of hardness such as alumina. Therefore, when the stress occurs in the interface between the resin part and the case or a region near the interface, the case is less likely to deform so as to follow the deformation of the resin part, whereby the stress is hard to relax.

When the stress generated in the interface between the resin part and the case and regions near the interface is not relaxed, peeling may occur in the interface between the resin part and the case accompanying deformation of the resin part, thereby forming a gap between the resin part and the sealed case. When the gap is formed between the resin part and the sealed case, a current is likely to flow through thus formed gap, thereby lowering the insulation property of the high voltage capacitor.

It is an object of the present invention to provide a high voltage capacitor which can relax stresses generated by deformations of the resin part and restrain the insulation property from lowering.

In one aspect, the present invention provides a high voltage capacitor comprising a columnar capacitor element body, made of a dielectric material, having a pair of principal surfaces opposing each other; a pair of electrodes arranged on the respective principal surfaces in the capacitor element body; a pair of terminal metal fittings connected to the respective electrodes; a case containing a resin material and having a bottom part formed with an opening for exposing one of the terminal metal fittings and a trunk part extending from an edge of the bottom part in a direction intersecting the bottom part, the bottom part and trunk part defining a space for containing the capacitor element body; and a resin part made of an insulating material and arranged within the case so as to seal the capacitor element body contained in the space; wherein the case has a degree of hardness lower than that of the resin part.

In this high voltage capacitor, the case containing the capacitor element body has a degree of hardness lower than that of the resin part sealing the capacitor element body within the case. Therefore, even when the resin part deforms because of some reasons, the case deforms so as to follow the deformation of the resin part, thereby relaxing stresses occurring in the interface between the resin part and the case and regions near the interface because of the deformation of the resin part. This makes it harder for gaps to be formed between the resin part and the case, whereby the high voltage capacitor can be restrained from lowering its insulation property.

The case may contain polybutylene terephthalate or polyethylene terephthalate as the resin material, while the resin part may contain an epoxy resin as the insulating material. This securely lowers the degree of hardness of the case and enhances that of the resin part. Hence, stresses caused by deformations of the resin part can be relaxed more appropriately.

The case may have a glass filler added to the resin material, while the resin part may contain silica or talc as the insulating material. This kind of high voltage capacitor may be used in an $SF_6$ gas atmosphere in order to secure its insulation property. The $SF_6$ gas may decompose depending on the status of its use thereby producing decomposed gases such as $SF_4^+$. Adding the glass filler to the resin material contained in the case can improve the resistance of the case to the decomposed gases produced from the $SF_6$ gas.

The one terminal metal fitting may be exposed by being inserted into the opening formed in the bottom part, at least the one terminal metal fitting may have an outer peripheral surface provided with a projection, an edge portion defining the opening in the bottom part may be in close contact with the outer peripheral surface of the one terminal metal fitting inserted in the opening, and the edge portion may be provided with a positioning part for abutting against the projection of the one terminal metal fitting and defining a position of the one terminal metal fitting. In this instance, the projection disposed on the outer peripheral surface of the terminal metal fitting and the positioning part provided in the edge portion of the case define the position of the terminal metal fitting with respect to the case. Therefore, the terminal metal fitting and the case can be positioned with respect to each other securely and easily.

Each of the pair of terminal metal fittings may have a first surface facing the electrode connected thereto and a second surface opposed to the first surface, the other terminal metal fitting may have an outer peripheral surface provided with a projection, and the projection of each of the pair of terminal metal fittings may be located in a center region in the opposing direction of the first and second surfaces on the outer peripheral surface corresponding thereto and continuous circumferentially of the outer peripheral surface.

Solder is typically used for connecting the terminal metal fitting and the electrode to each other. At this time, molten solder may flow down the outer peripheral surface of the terminal metal fitting and solidify while in contact with the outer peripheral surface. When inserting the terminal metal fitting into the opening of the case (bottom part), the solder attached to the outer peripheral surface of the terminal metal fitting, if any, may form a gap between the edge portion defining the opening and the outer peripheral surface of the terminal metal fitting and allow the resin for forming the resin part to leak through the gap. When the outer peripheral surface of each of the pair of terminal metal fittings is provided with a circumferentially continuous projection, the molten solder is stopped by the projection from flowing down the outer peripheral surface of beyond the projection. Therefore, when inserting the terminal metal fitting into the opening of the case (bottom part), no gap is formed between the edge portion defining the opening and the outer peripheral surface of the terminal metal fitting, whereby the resin can be prevented from leaking.

Since the projection of the terminal metal fitting is disposed in the center region in the opposing direction of the first and second surfaces of the terminal metal fitting, it is unnecessary to take account of the orientation of the terminal metal fitting when connecting the terminal metal fitting and the electrode to each other. That is, the terminal metal fitting and the electrode can be connected to each other regardless of whether the first or second surface of the terminal metal fitting opposes the electrode, whereby the terminal metal fitting and the electrode can easily be connected to each other.

The outer surface side of the bottom part may be provided with a depression surrounding and continuing into the opening. When inserting the terminal metal fitting into the opening in the bottom part of the case, a part of the case may be scraped off by the terminal metal fitting, and the resulting scraped fragment may adhere to the terminal metal fitting. When filling the case with a resin for forming the resin part, manufacturing errors in the case, terminal metal fitting, and the like may cause the resin to leak and adhere to the terminal metal fitting. The fragment or resin thus adhering to the terminal metal fitting may obstruct the conductivity of the terminal metal fitting. The depression formed on the outer surface side of the bottom part accommodates the above-mentioned fragment or resin and restrains it from adhering to the terminal metal fitting. This can prevent the conductivity of the terminal metal fitting from being obstructed.

The high voltage capacitor may further comprise a layer made of a resin containing alumina and arranged on a surface of the resin part exposed from the case. In this instance, the surface of the resin part is covered with a layer made of a resin containing alumina, whereby the resin part can be prevented from being discolored by decomposed gases produced from the $SF_6$ gas.

The case may have a thickness of at least 0.3 mm but not more than 1.8 mm. When the thickness of the case is less than 0.3 mm, the case may have such a low strength as to break. The case with the thickness of more than 1.8 mm may have a relatively high strength which inhibits it from following the deformation of the resin part. Therefore, the thickness of the case is preferably at least 0.3 mm but not more than 1.8 mm.

The case may further have a flange arranged on the outer peripheral surface of the trunk part. This increases the creepage distance on the outer peripheral surface of the case and thus can prevent surface discharge from occurring.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, the same constituents or those having the same functions will be referred to with the same signs while omitting their overlapping descriptions.

Figure 1:
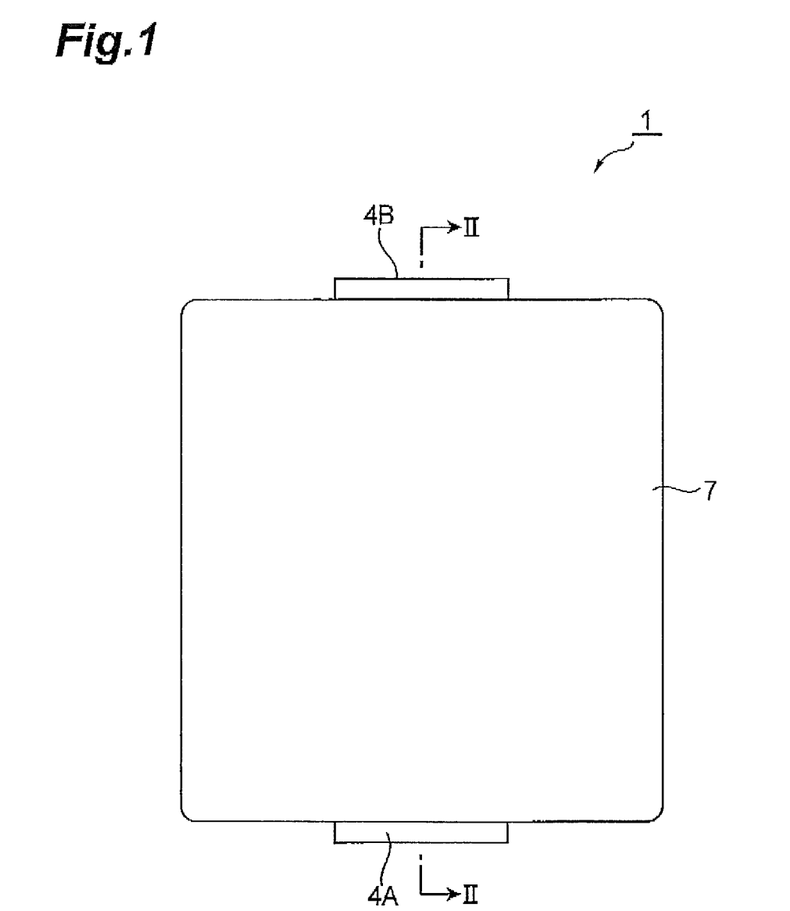
FIG. 1 is a side view of the high voltage capacitor in accordance with an embodiment.
Figure 2:
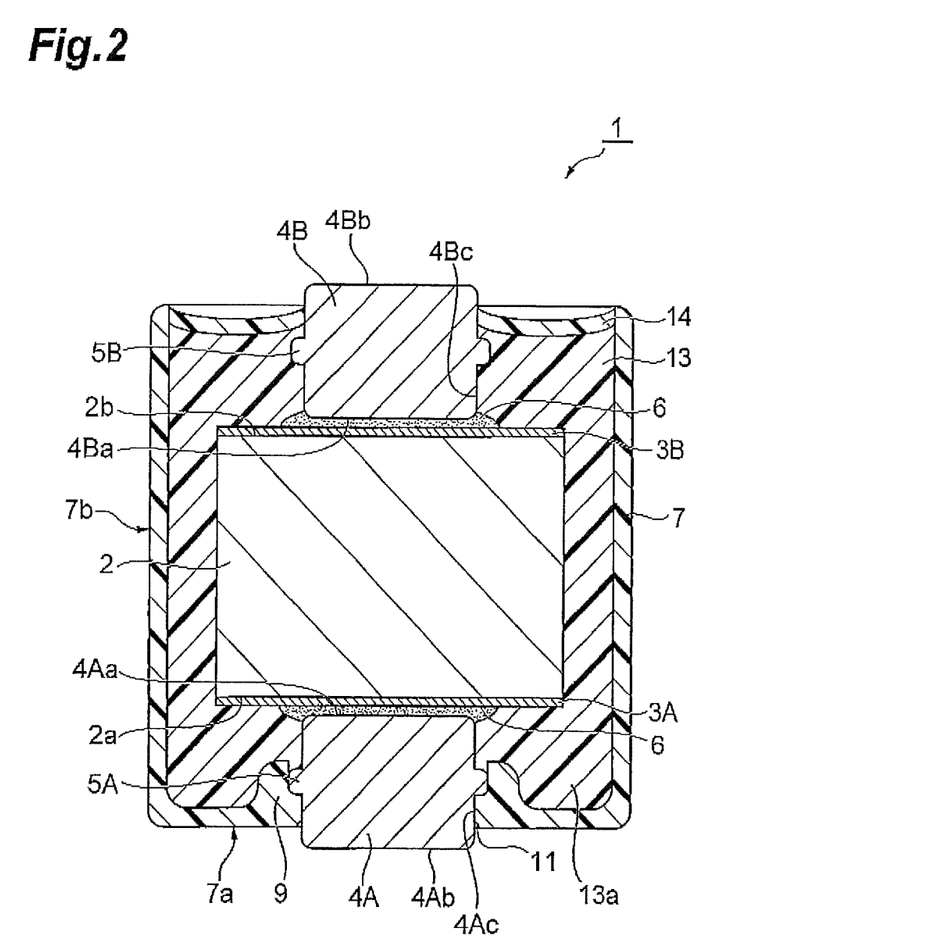
FIG. 2 is a diagram for explaining a cross-sectional structure taken along the line II-II of FIG. 1.
Figure 3:
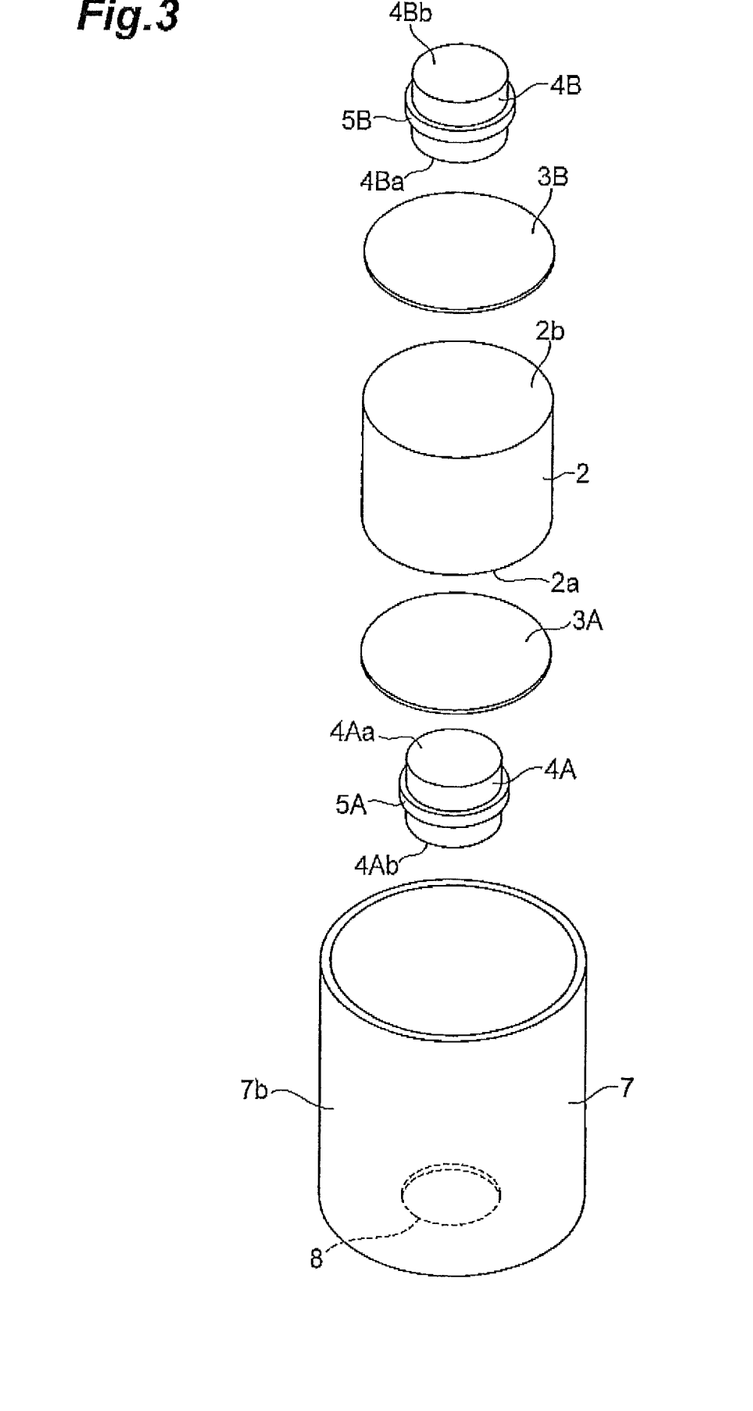
FIG. 3 is an exploded perspective view of the high voltage capacitor in accordance with the embodiment.
Figure 4:
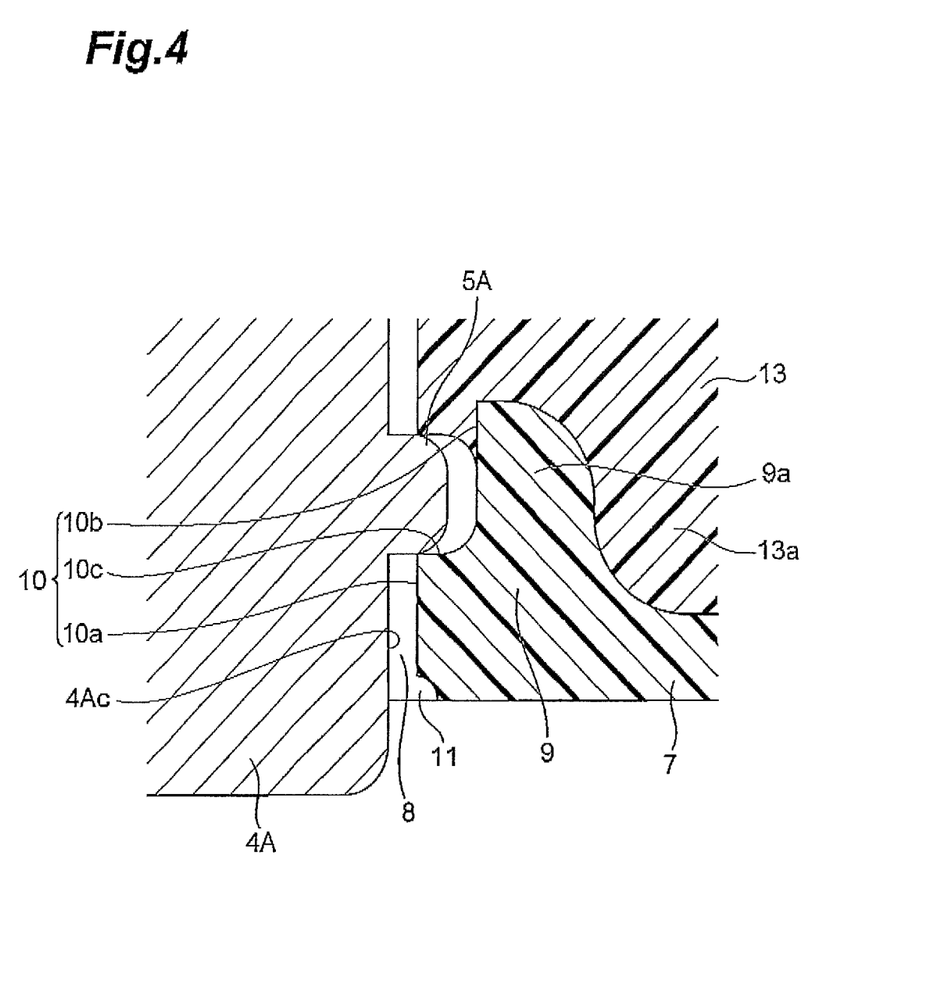
FIG. 4 is a sectional view illustrating a terminal metal fitting and a case under magnification.

The structure of a high voltage capacitor 1 in accordance with an embodiment will be explained with reference to FIGS. 1 to 4. FIG. 1 is a side view of the high voltage capacitor in accordance with this embodiment. FIG. 2 is a diagram for explaining a cross-sectional structure taken along the line II-II of FIG. 1. FIG. 3 is an exploded perspective view of the high voltage capacitor in accordance with the embodiment. FIG. 4 is a sectional view illustrating a terminal metal fitting and a case under magnification.

As illustrated in FIGS. 2 and 3, the high voltage capacitor 1 comprises a capacitor element body 2, a pair of electrodes 3A, 3B arranged on surfaces of the capacitor element body 2, and terminal metal fittings 4A, 4B connected to the respective electrodes 3A, 3B. The capacitor element body 2 is made of a dielectric material such as ceramics. The capacitor element body 2 is columnar and more specifically has a circular columnar form. The capacitor element body 2 has a pair of principal surfaces 2a, 2b opposing each other as its bottom faces.

The electrodes 3A, 3B are arranged on the principal surfaces 2a, 2b of the capacitor element body 2, respectively. The electrodes 3A, 3B, each of which is formed into a thin sheet having a thickness on the order of several tens of μm, are disposed so as to cover the principal surfaces 2a, 2b, respectively. The electrodes 3A, 3B are formed, for example, by applying and sintering a conductive paste containing a conductive metal powder onto the principal surfaces 2a, 2b of the capacitor element body 2.

The terminal metal fitting 4A (one terminal metal fitting) has a first surface 4Aa facing the electrode 3A and a second surface 4Ab opposed to the first surface 4Aa. The terminal metal fitting 4A is made of a metal such as brass, for example. The terminal metal fitting 4A has a projection 5A on its outer peripheral surface 4Ac. The terminal metal fitting 4A is connected to the electrode 3A through solder 6. The terminal metal fitting 4A and the electrode 3A are connected to each other in the following manner. First, cream solder is applied onto the terminal metal fitting 4A and dried. Thereafter, the surface coated with the cream solder is connected to the electrode 3A. The terminal metal fitting 4A has a circular columnar form extending in a direction parallel to the center axis of the capacitor element body 2. The projection 5A is located in a center region in the opposing direction of the first and second surfaces 4Aa, 4Ab on the outer peripheral surface 4Ac. The projection 5A is circumferentially continuous on the outer peripheral surface 4Ac.

The terminal metal fitting 4B (the other terminal metal fitting) is connected to the electrode 3B through solder 6. The form and material of the terminal metal fitting 4B are the same as those of the terminal metal fitting 4A. The terminal metal fitting 4B has a first surface 4Ba facing the electrode 3B, a second surface 4Bb opposed to the first surface 4Ba, an outer peripheral surface 4Bc, and a projection 5B on the outer peripheral surface 4Bc. The projection 5B is located in a center region in the opposing direction of the first and second surfaces 4Ba, 4Bb on the outer peripheral surface 4Bc. The projection 5B is circumferentially continuous on the outer peripheral surface 4Bc.

The high voltage capacitor 1 comprises a case 7 and a resin part 13 arranged within the case 7. The case 7 has a bottom part 7a and a trunk part 7b. The bottom part 7a has a disc shape with an opening 8 formed at a center portion thereof. The terminal metal fitting 4A is inserted into the opening 8, whereby the second surface 4Ab of the terminal metal fitting 4A is exposed from the opening 8. The trunk part 7b is circular columnar and extends from an edge of the bottom part 7a in a direction intersecting the bottom part 7a, more specifically in a direction substantially orthogonal thereto. In this embodiment, the bottom part 7a and the trunk part 7b are formed integrally with each other.

The bottom part 7a and the trunk part 7b define a space for containing the capacitor element body 2. The case 7 contains a resin material. Examples of the resin material include polybutylene terephthalate and polyethylene terephthalate. Glass fillers are added to the resin material. The side of the trunk part 7b opposite from the bottom part 7a is not closed but open to the outside of the case 7. That is, the case 7 is a bottomed member with one end side of the trunk part 7b opening. The thickness of the case 7 is at least 0.3 mm but not more than 1.8 mm.

The structure of the surroundings of the opening 8 will now be explained in more detail with reference to FIG. 4. The opening 8 has smaller and larger diameters on the outer and inner sides of the case 7, respectively. An edge portion 9 defining the opening 8 is provided with a stepped part 10 and a depression 11.

The stepped part 10 connects the smaller and larger diameter portions of the opening 8 to each other. The stepped part 10 is constituted by an inner peripheral surface 10a in the smaller diameter portion, an inner peripheral surface 10b in the larger diameter portion, and a stepped surface 10c connecting the inner peripheral surfaces 10a and 10b to each other. The inner peripheral surface 10a is in close contact with the outer peripheral surface 4Ac of the terminal metal fitting 4A inserted in the opening 8. This prevents a resin injected into the case 7 for forming the resin part 13, which will be explained later, from leaking through gaps between the terminal metal fitting 4A and the case 7.

The inner peripheral surface 10b and stepped surface 10c abut against the projection 5A of the terminal metal fitting 4A, thereby defining the position of the terminal metal fitting 4A. This allows the stepped part 10 to function as a positioning part for defining the position of the terminal metal fitting 4A. FIG. 4 illustrates the terminal metal fitting 4A as being separated from the case 7 and the resin part 13, which will be explained later, in order for the forms of the terminal metal fitting 4A and case 7 to be seen easily. However, the terminal metal fitting 4A is in close contact with the case 7 in practice. That is, the outer peripheral surface 4Ac and the inner peripheral surface 10a are in close contact with each other, while the projection 5A abuts against the inner peripheral surface 10b and stepped surface 10c. Similarly, the terminal metal fitting 4A is in close contact with the resin part 13.

The depression 11 is formed on the outer surface side of the bottom part 7a of the case 7 so as to surround and continue into the opening 8. Since the depression 11 is provided, even when the resin injected into the case 7 or molten solder leaks from the gap between the terminal metal fitting 4A and the edge portion 9 of the opening 8, the depression 11 can contain the leaked resin. When inserted into the opening 8, the terminal metal fitting 4A may scrape off a portion of the bottom part 7a of the case 7 in the edge portion 9 of the opening 8. In such an instance, the depression 11 may contain fragments of the scraped portion of the bottom part 7a.

The resin part 13 is arranged within the case 7 so as to seal the capacitor element body 2 within the case 7. The resin part 13 is made of an insulating material. Here, the case 7 has a degree of hardness lower than that of the resin part 13. For satisfying such a relationship of hardness between the case 7 and the resin part 13 when the case 7 contains the resin material (polybutylene terephthalate or polyethylene terephthalate) having the glass fillers added thereto, the resin part 13 contains silica or talc as well as an epoxy resin as the insulating material, for example. The exploded perspective view of FIG. 3 omits the resin part 13.

A cover layer 14 is arranged on a surface exposed from the case 7 in the resin part 13. The cover layer 14 is made of a resin containing alumina. In this embodiment, the cover layer 14 is arranged on the side opposite from the bottom part 7a of the case 7 in the resin part 13. The cover layer 14 has such a property that it is less likely to be discolored by decomposed gases such as $SF_4^+$ produced from the $SF_6$ gas than the resin part 13.

The edge portion 9 includes a projection 9a projecting from the bottom part 7a of the case 7 to the inside of the case 7 (the space containing the capacitor element body 2), i.e., projecting toward one end of the trunk part 7b. The inner peripheral surface of the projection 9a corresponds to the inner peripheral surface 10b. A portion 13a of the resin part 13 is arranged in a space defined by the projection 9a, bottom part 7a, and trunk part 7b. Therefore, the portion 13a of the resin 13 is located between the edge portion 9 (projection 9a) and the trunk part 7b. The portion 13a of the resin part 13 is in close contact with the projection 9a, bottom part 7a, and trunk part 7b.

As in the foregoing, in the high voltage capacitor 1 in accordance with this embodiment, the case 7 containing the capacitor element body 2 has a degree of hardness lower than that of the resin part 13 sealing the capacitor element body 2 within the case 7. Therefore, even when the resin part 13 deforms because of some reasons, the case 7 deforms so as to follow the deformation of the resin part 13, thereby relaxing stresses occurring in the interface between the resin part 13 and the case 7 and regions near the interface because of the deformation of the resin part 13. This makes it harder for gaps to be formed between the resin part 13 and the case 7, whereby the high voltage capacitor 1 can be restrained from lowering its insulation property.

In this embodiment, the case 7 contains polybutylene terephthalate or polyethylene terephthalate as a resin material, while the resin part 13 contains an epoxy resin as an insulating material. This can securely lower the degree of hardness of the case 7 and enhance that of the resin part 13. Hence, stresses caused by deformations of the resin part 13 can be relaxed more appropriately.

In this embodiment, the case 7 has glass fillers added to the resin material, while the resin part 13 contains silica or talc as the insulating material. This kind of high voltage capacitor 1 may be used in an $SF_6$ gas atmosphere in order to secure its insulation property. The $SF_6$ gas may decompose depending on the status of its use, thereby producing decomposed gases such as $SF_4^+$. Since the glass fillers are added to the resin material contained in the case 7, the resistance of the case 7 to the decomposed gases produced from the SF$_6$ gas can be improved. The resistance to the decomposed gases can be improved in particular when glass fillers other than those based on silica are added to the resin material contained in the case 7.

In this embodiment, the terminal metal fitting 4A is exposed by being inserted into the opening 8 formed in the bottom part 7a. The outer peripheral surface 4Ac of the terminal metal fitting 4A is provided with the projection 5A. The edge portion 9 defining the opening 8 in the bottom part 7a is in close contact with the outer peripheral surface 4Ac of the terminal metal fitting 4A inserted in the opening 8. The edge portion 9 is provided with the stepped part 10 as a positioning part for abutting against the projection 5A of the terminal metal fitting 4A and defining a position of the terminal metal fitting 4A. As a consequence, the projection 5A disposed on the outer peripheral surface 4Ac of the terminal metal fitting 4A and the positioning part provided in the edge portion 9 of the case 7 define the position of the terminal metal fitting 4A with respect to the case 7, whereby the terminal metal fitting 4A and the case 7 can be positioned with respect to each other securely and easily.

In this embodiment, a pair of terminal metal fittings 4A, 4B have the first surfaces 4Aa, 4Ba facing the electrodes 3A, 3B connected thereto and the second surfaces 4Ab, 4Bb opposed to the first surfaces 4Aa, 4Ba. The outer peripheral surface 4Bc of the terminal metal fitting 4B is also provided with the projection 5B. The projections 5A, 4B of the pair of terminal metal fittings 4A, 413 are located in center regions in the opposing direction of the first and second surfaces 4Aa, 4Ba; 4Ab, 4Bb on the outer peripheral surfaces 4Ac, 4Bc corresponding thereto and continuous circumferentially of the outer peripheral surfaces 4Ac, 4Bc.

Solder 6 is typically used for connecting the terminal metal fittings 4A, 413 and the electrodes 3A, 3B to each other. At this time, the molten solder 6 may flow down the outer peripheral surface 4Ac of the terminal metal fitting 4A and solidify while in contact with the outer peripheral surface 4Ac or may flow down the outer peripheral surface 4Bc of the terminal metal fitting 4B and solidify while in contact with the outer peripheral surface 4Bc. Suppose that the solder 6 adheres to the outer peripheral surface 4Ac of the terminal metal fitting 4A inserted in the opening 8 as illustrated in FIG. 2. When inserting the terminal metal fitting 4A into the opening 8 of the case 7 (bottom part 7a), the solder 6 attached to the outer peripheral surface 4Ac of the terminal metal fitting 4A, if any, may form a gap between the edge portion 9 defining the opening 8 and the outer peripheral surface 4Ac of the terminal metal fitting 4A and allow the resin for forming the resin part 13 to leak through the gap.

In this embodiment, the outer peripheral surface 4Ac of the terminal metal fitting 4A is provided with the circumferentially continuous projection 5A. For this reason, the molten solder 6 is stopped by the projection 5A from flowing down the outer peripheral surface 4Ac of the 4A beyond the projection 5A. Therefore, when inserting the terminal metal fitting 4A into the opening 8 of the case 7 (bottom part 7a), no gap is formed between the edge portion 9 defining the opening 8 and the outer peripheral surface 4Ac of the terminal metal fitting 4A, whereby the resin can be prevented from leaking.

The molten solder 6 is also stopped by the projection 5B from flowing down the outer peripheral surface 4Bc of 4B beyond the projection 5B. Therefore, even when inserting the terminal metal fitting 4B into the opening 8, no gap is formed between the outer peripheral surface 4Bc of the terminal metal fitting 4B and the edge portion 9 defining the opening 8, whereby the resin can be prevented from leaking. In this embodiment, the terminal metal fitting 4B has the same form as with the terminal metal fitting 4A and thus may be inserted into the opening 8.

In this embodiment, the projections of the terminal metal fittings 4A, 4B are disposed in the center regions in the opposing direction of the first and second surfaces 4Aa, 4Ba; 4Ab, 4Bb of the terminal metal fittings 4A, 4B. This makes it unnecessary to take account of the orientation of the terminal metal fittings 4A, 4B when connecting the terminal metal fittings 4A, 4B and the electrodes 3A, 3B to each other. That is, the terminal metal fittings 4A, 4B and the electrodes 3A, 3B can be connected to each other regardless of whether the first or second surfaces 4Aa, 4Ba; 4Ab, 4Bb of the terminal metal fittings 4A, 4B oppose the electrodes, whereby the terminal metal fittings 4A, 4B and the electrodes 3A, 3B can easily be connected to each other.

In this embodiment, the outer surface side of the bottom part 7a is provided with the depression 11 surrounding and continuing into the opening 8. When inserting the terminal metal fitting 4A into the opening 8 in the bottom part 7a of the case 7, a part of the case 7 may be scraped off by the terminal metal fitting 4A, and the resulting scraped fragment may adhere to the terminal metal fitting 4A. When filling the case 7 with a resin for forming the resin part 13, manufacturing errors in the case 7, terminal metal fitting 4A, and the like may cause the resin to leak and adhere to the terminal metal fitting 4A. The fragment or resin thus adhering to the terminal metal fitting 4A may obstruct the conductivity of the terminal metal fitting 4A. The depression 11 formed on the outer surface side of the bottom part 7a accommodates the above-mentioned fragment or resin and restrains it from adhering to the terminal metal fitting 4A. This can prevent the conductivity of the terminal metal fitting 4A from being obstructed.

This embodiment further comprises the cover layer 14 made of a resin containing alumina and arranged on a surface of the resin part 13 exposed from the case 7. As a consequence, the surface of the resin part 13 is covered with the cover layer 14, whereby the resin part 13 can be prevented from being discolored by decomposed gases produced from the SF$_6$ gas.

In this embodiment, the case 7 may have a thickness of at least 0.3 mm but not more than 1.8 mm. When the thickness of the case 7 is less than 0.3 mm, the case 7 may have such a low strength as to break. The case 7 with the thickness of more than 1.8 mm may have a relatively high strength which inhibits it from following the deformation of the resin part 13. Therefore, the thickness of the case 7 is preferably at least 0.3 mm but not more than 1.8 mm.

In this embodiment, a portion 13a of the resin part 13 is located between the edge portion 9 (projection 9a) and the trunk part 7b. The resin part 13 has a degree of hardness higher than that of the case 7. Since the portion 13a of the resin part 13 having a degree of hardness higher than that of the edge portion. 9 (projection 9a) is located on the outer periphery side of the edge portion 9 (projection 9a), the edge portion 9s is restrained from deforming even when external forces act on the edge portion 9 and the like. Since the edge portion. 9 is restrained from deforming, gaps can be prevented from being formed between the edge portion 9 and the terminal metal fitting 4A.

Figure 5:
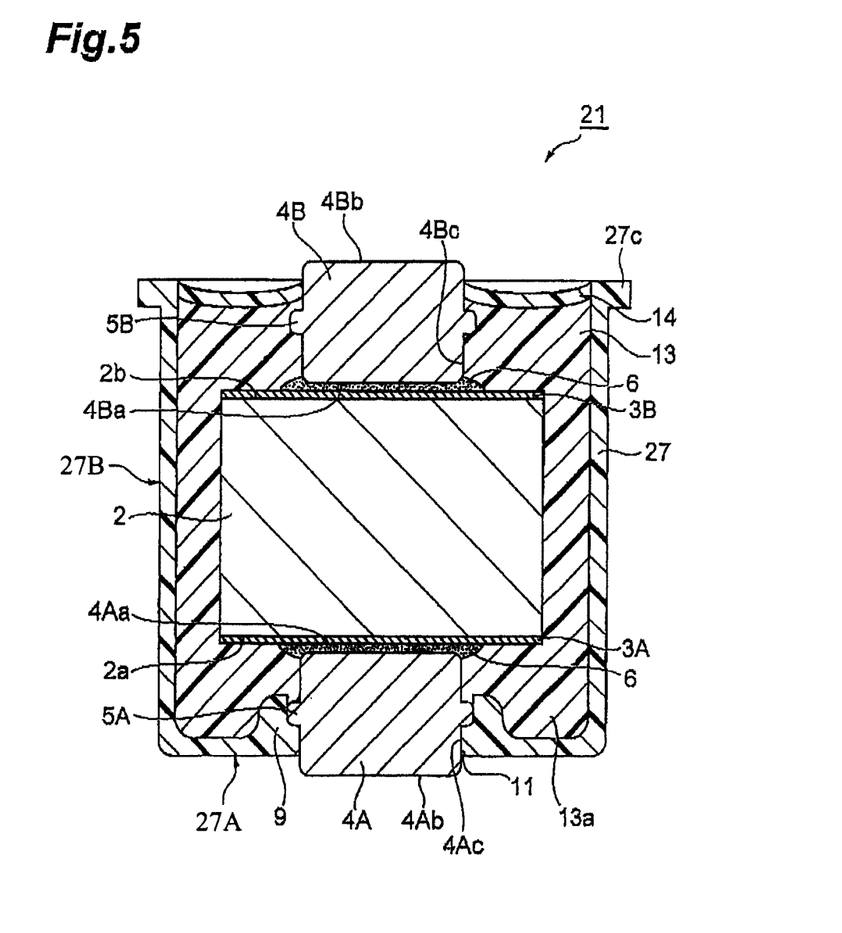
FIG. 5 is a diagram for explaining a cross-sectional structure of the high voltage capacitor in accordance with a modified example of the embodiment.
Figure 6:
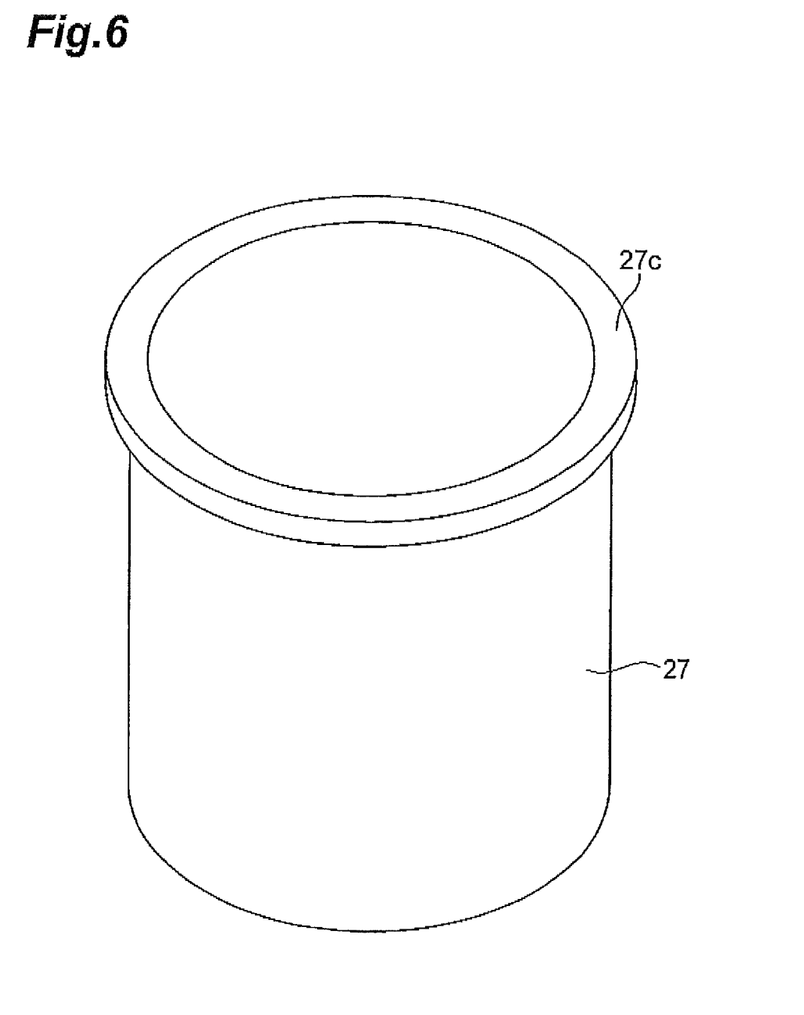
FIG. 6 is a perspective view of the case provided for the high voltage capacitor in accordance with the modified example of the embodiment.

The structure of a high voltage capacitor 21 in accordance with a modified example of the embodiment will now be explained with reference to FIGS. 5 and 6. FIG. 5 is a diagram for explaining a cross-sectional structure of the high voltage capacitor in accordance with a modified example of the embodiment. FIG. 6 is a perspective view of the case provided for the high voltage capacitor in accordance with the modified example of the embodiment.

The high voltage capacitor 21 differs from the former high voltage capacitor 1 in that it comprises a case 27 in place of the case 7. As with the case 7, the case 27 has a bottom part 27a and a trunk part 27b. The case 27 further has a flange 27c arranged on the outer peripheral surface of the trunk part 27b. The flange 27c is disposed so as to circle the outer peripheral surface of the trunk part 27b. In this modified example, the flange 27c is disposed at an end part of the case 27 on the side opposite from the bottom part 27a. However, the flange part 27c may be arranged at any position on the outer peripheral surface of the trunk part 27b.

In the high voltage capacitor 21 in accordance with the modified example of this embodiment, the case 27 further has the flange 27c arranged on the outer peripheral surface of the trunk part 27b. This increases the creepage distance on the outer peripheral surface of the case 27 and thus can prevent surface discharge from occurring.

While a preferred embodiment of the present invention is explained in the foregoing, the present invention is not necessarily limited to the above-mentioned embodiment but may be modified in various ways within the scope not deviating from the gist thereof. For example, the cover layer 14 may be omitted. The capacitor element body 2 may be formed into a prism or the like instead of the circular column.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A high voltage capacitor comprising:
    a columnar capacitor element body, made of a dielectric material, having a pair of principal surfaces opposing each other;
    a pair of electrodes arranged on the respective principal surfaces in the capacitor element body;
    a pair of terminal metal fittings connected to the respective electrodes;
    a case containing a resin material and having a bottom part formed with an opening for exposing one of the terminal metal fittings and a trunk part extending from an edge of the bottom part in a direction intersecting the bottom part, the bottom part and the trunk part defining a space for containing the capacitor element body; and
    a resin part made of an insulating material and arranged within the case so as to seal the capacitor element body contained in the space;
    wherein the case has a degree of hardness lower than that of the resin part,
    wherein the one terminal metal fitting is exposed by being inserted into the opening formed in the bottom part,
    wherein at least the one terminal metal fitting has an outer peripheral surface provided with a projection extending along a circumferential direction of the outer peripheral surface,
    wherein an edge portion defining the opening in the bottom part is in close contact with the outer peripheral surface of the one terminal metal fitting inserted in the opening, and
    wherein the edge portion is provided with a positioning part for abutting against the projection of the one terminal metal fitting and defining a position of the one terminal metal fitting.

2. The high voltage capacitor according to claim 1, wherein the case contains polybutylene terephthalate or polyethylene terephthalate as the resin material; and
    wherein the resin part contains an epoxy resin as the insulating material.

3. The high voltage capacitor according to claim 1, wherein the case has a glass filler added to the resin material; and
    wherein the resin part contains silica or talc as the insulating material.

4. The high voltage capacitor according to claim 1, wherein the projection is continuous circumferentially of the outer peripheral surface.

5. The high voltage capacitor according to claim 1, wherein each of the pair of terminal metal fittings has a first surface facing the electrode connected thereto and a second surface opposed to the first surface;
    wherein the other terminal metal fitting has an outer peripheral surface provided with a projection; and
    wherein the projection of each of the pair of terminal metal fittings is located in a center region in the opposing direction of the first and second surfaces on the outer peripheral surface corresponding thereto and continuous circumferentially of the outer peripheral surface.

6. The high voltage capacitor according to claim 1, wherein the outer surface side of the bottom part is provided with a depression surrounding and continuing into the opening.

7. The high voltage capacitor according to claim 1, further comprising a layer made of a resin containing alumina and arranged on a surface of the resin part exposed from the case.

8. The high voltage capacitor according to claim 1, wherein the case has a thickness of at least 0.3 mm but not more than 1.8 mm.

9. The high voltage capacitor according to claim 1, wherein the case further has a flange arranged on an outer peripheral surface of the trunk part.

10. A high voltage capacitor comprising:
    a columnar capacitor element body, made of a dielectric material, having a pair of principal surfaces opposing each other;
    a pair of electrodes arranged on the respective principal surfaces in the capacitor element body;
    a pair of terminal metal fittings connected to the respective electrodes;
    a case containing a resin material and having a bottom part formed with an opening for exposing one of the terminal metal fittings and a trunk part extending from an edge of the bottom part in a direction intersecting the bottom part, the bottom part and the trunk part defining a space for containing the capacitor element body; and
    a resin part made of an insulating material and arranged within the case so as to seal the capacitor element body contained in the space;
    wherein the case has a degree of hardness lower than that of the resin part,
    wherein the one terminal metal fitting is exposed by being inserted into the opening formed in the bottom part,
    wherein at least the one terminal metal fitting has an outer peripheral surface provided with a projection,
    wherein an edge portion defining the opening in the bottom part is in close contact with the outer peripheral surface of the one terminal metal fitting inserted in the opening,
    wherein the edge portion is provided with a positioning part for abutting against the projection of the one terminal metal fitting and defining a position of the one terminal metal fitting, wherein each of the pair of terminal metal fittings has a first surface facing the electrode connected thereto and a second surface opposed to the first surface, wherein the other terminal metal fitting has an outer peripheral surface provided with a projection, and wherein the projection of each of the pair of terminal metal fittings is located in a center region in the opposing direction of the first and second surfaces on the outer peripheral surface corresponding thereto and continuous circumferentially of the outer peripheral surface.

11. The high voltage capacitor according to claim 10, wherein the case contains polybutylene terephthalate or polyethylene terephthalate as the resin material; and wherein the resin part contains an epoxy resin as the insulating material.

12. The high voltage capacitor according to claim 10, wherein the case has a glass filler added to the resin material; and wherein the resin part contains silica or talc as the insulating material.

13. The high voltage capacitor according to claim 10, wherein the outer surface side of the bottom part is provided with a depression surrounding and continuing into the opening.

14. The high voltage capacitor according to claim 10, further comprising a layer made of a resin containing alumina and arranged on a surface of the resin part exposed from the case.

15. The high voltage capacitor according to claim 10, wherein the case has a thickness of at least 0.3 mm but not more than 1.8 mm.

16. The high voltage capacitor according to claim 10, wherein the case further has a flange arranged on an outer peripheral surface of the trunk part.

* * * * *